United States Patent [19]

Henderson et al.

[11] Patent Number: 4,961,080

[45] Date of Patent: Oct. 2, 1990

[54] LASER MARKER WITH MASK SCANNING

[75] Inventors: Andrew R. Henderson, Milton; Robert Jones, Cambridge, both of England

[73] Assignee: The Wiggins Teape Group Limited, Basingstoke, England

[21] Appl. No.: 310,875

[22] Filed: Feb. 16, 1989

[30] Foreign Application Priority Data

Feb. 16, 1988 [GB] United Kingdom ................. 8803560

[51] Int. Cl.⁵ ....................... G01D 15/14; G02B 26/08
[52] U.S. Cl. ..................................... 346/108; 350/6.5; 350/6.8
[58] Field of Search .................. 346/108, 107 R, 160; 350/615, 617, 618; 358/481

[56] References Cited

U.S. PATENT DOCUMENTS

| | | |
|---|---|---|
| 3,186,861 | 6/1965 | Smith et al. . |
| 3,256,524 | 6/1966 | Stauffer . |
| 3,488,102 | 1/1970 | Buch et al. ........................... 350/6.8 |
| 3,509,249 | 4/1970 | Molines et al. . |
| 3,584,963 | 6/1971 | Wisner . |
| 3,702,094 | 11/1972 | Sinnott et al. . |
| 3,821,753 | 6/1974 | Sinnott et al. . |
| 3,827,063 | 7/1974 | Sinnott et al. . |
| 3,903,735 | 9/1975 | Wilson . |
| 3,943,324 | 3/1976 | Haggerty . |
| 3,958,253 | 5/1976 | Rueckmann . |
| 4,024,545 | 5/1977 | Dowling et al. . |
| 4,057,784 | 11/1977 | Tofoya ................................. 350/6.7 |
| 4,118,619 | 10/1978 | McArthur et al. . |
| 4,121,595 | 10/1978 | Heitmann et al. . |
| 4,142,401 | 3/1979 | Wilson . |
| 4,160,913 | 7/1979 | Brenholdt . |
| 4,240,448 | 12/1980 | Heitmann et al. . |
| 4,302,654 | 11/1981 | Bennett et al. . |
| 4,356,375 | 10/1982 | Josephy et al. . |
| 4,378,480 | 3/1983 | Langhans . |
| 4,397,483 | 8/1983 | Hiraishi et al. . |
| 4,401,992 | 8/1983 | Vorst et al. . |
| 4,424,519 | 1/1984 | Neumann et al. ................... 346/108 |
| 4,496,961 | 1/1985 | Devrient . |
| 4,499,361 | 2/1985 | Brinker . |
| 4,499,362 | 2/1985 | Martin . |
| 4,507,535 | 3/1985 | Bennett et al. . |
| 4,519,680 | 5/1985 | Grollimund . |
| 4,537,809 | 8/1985 | Ang et al. . |
| 4,568,815 | 2/1986 | Kimbara et al. . |
| 4,612,555 | 9/1986 | Hongon et al. . |
| 4,612,556 | 9/1986 | de Moria . |
| 4,740,269 | 4/1988 | Berger et al. . |
| 4,772,798 | 9/1988 | Craig ..................................... 350/6.8 |
| 4,796,038 | 1/1989 | Allen et al. . |

FOREIGN PATENT DOCUMENTS

| | | |
|---|---|---|
| 27698 | 10/1979 | European Pat. Off. . |
| 0021165 | 1/1981 | European Pat. Off. . |
| 0042173 | 10/1982 | European Pat. Off. . |

(List continued on next page.)

OTHER PUBLICATIONS

Silicon Processing for the VLSI Era, vol. 1, Process Technology, Stanley Wolf and Richard N. Tauber, Lattice Press, 1987, pp. 493–505.

(List continued on next page.)

*Primary Examiner*—Mark J. Reinhart
*Attorney, Agent, or Firm*—Burns, Doane, Swecker & Mathis

[57] ABSTRACT

A laser beam is used to mark a longitudinally moving web of paper both at intervals along its length and at plural locations across its width so that each of the sheets finally cut from the web bears a mark. The web passes over a cylinder having windows bearing masks carrying a logo or the like to be marked on the web. Mirrors are arranged on a drum assembly coaxially located in the cylinder to rotate therewith. The mirrors are disposed in helical sets extending along the axis of the drum to successively intercept a laser beam directed parallel to the axis of the drum and to reflect the beam to successive mask windows. The mirrors are plane mirrors set at 45° to the axis and cause the beam to scan the mask in the circumference direction. The beam is collimated but not focussed and has a diameter that encompasses the transverse width of the mask. A ring mode laser beam is preferred.

41 Claims, 4 Drawing Sheets

FOREIGN PATENT DOCUMENTS

| | | |
|---|---|---|
| 0098013 | 1/1984 | European Pat. Off. . |
| 0119034 | 9/1984 | European Pat. Off. . |
| 47604 | 11/1984 | European Pat. Off. . |
| 2820462 | 3/1979 | Fed. Rep. of Germany . |
| 3431577 | 8/1984 | Fed. Rep. of Germany . |
| 3418188 | 9/1987 | Fed. Rep. of Germany . |
| 2158921 | 6/1973 | France . |
| 59-157612 | 1/1985 | Japan . |
| WO87/05850 | 10/1987 | PCT Int'l Appl. . |
| 972071 | 10/1964 | United Kingdom . |
| 998711 | 7/1965 | United Kingdom . |
| 1012430 | 12/1965 | United Kingdom . |
| 1036627 | 7/1966 | United Kingdom . |
| 1128616 | 9/1968 | United Kingdom . |
| 1249138 | 10/1971 | United Kingdom . |
| 1405487 | 9/1975 | United Kingdom . |
| 1409653 | 10/1975 | United Kingdom . |
| 1603752 | 5/1978 | United Kingdom . |
| 2022492 | 5/1979 | United Kingdom . |
| 2027628 | 7/1979 | United Kingdom . |
| 2032323 | 9/1979 | United Kingdom . |
| 2022987 | 12/1979 | United Kingdom . |
| 2032325 | 5/1980 | United Kingdom . |
| 1569725 | 6/1980 | United Kingdom . |
| 2044175 | 10/1980 | United Kingdom . |
| 1588980 | 5/1981 | United Kingdom . |
| 2074341 | 10/1981 | United Kingdom . |
| 1602133 | 11/1981 | United Kingdom . |
| 2074493 | 11/1981 | United Kingdom . |
| 2094211 | 9/1982 | United Kingdom . |
| 2101029 | 1/1983 | United Kingdom . |
| 2133352 | 1/1983 | United Kingdom . |
| 2143649 | 6/1983 | United Kingdom . |
| 2144873 | 7/1983 | United Kingdom . |
| 2113142 | 8/1983 | United Kingdom . |
| 2118882 | 11/1983 | United Kingdom . |
| 2131767 | 12/1983 | United Kingdom . |
| 2126955 | 4/1984 | United Kingdom . |
| 2127567 | 4/1984 | United Kingdom . |
| 2173452 | 4/1984 | United Kingdom . |
| 2137068 | 10/1984 | United Kingdom . |
| 2170504 | 2/1985 | United Kingdom . |
| 2149644 | 6/1985 | United Kingdom . |
| 2155754 | 10/1985 | United Kingdom . |
| 2161752 | 1/1986 | United Kingdom . |

OTHER PUBLICATIONS

"Fast Laser Pulses Can Etch a Pattern in a Moving Part on a Production Line", Laser Focus, Jul. 1975, pp. 28–31, partial copies.

"Neodymium Yttrium Aluminum Garnet (Nd: YAG) Laser Marking System", *SPIE vol.* 247, *Advances in Laser Engineering and Application* (1980), p. 18.

*Dagens Industri*, vol. 7, No. 118, Nov. 23, 1983, p. 42.

"The Advance of Laser Coding", Dr. Greg Sharp—Dent, *Packaging*, Jul. 1983.

Article, *Xerox Disclosure Journal*, vol. 5, No. 2, Mar.-/Apr. 1980.

"Product Marking with ND:YAG and $CO_2$ Lasers", M. J. Weiner, *SPIE vol.* 86 *Industrial Application of High Power Laser Technology* (1976), p. 23.

"Lasers—a Cut Above the rest", Dr. Ian Spalding, *Lind-Up,* Jan.-Mar. 1986.

Article, *Financial Times.*

"Laser Mark", Lumonics.

"Laser Brand", Material from Laser Applications.

"Simply Code it with Laserprint", Material from Laserprint.

LASER MARKER WITH MASK SCANNING

This invention relates to marking a moving sheet of material by using light energy, and more particularly to repetitively marking a longitudinally moving web of material along a plurality of longitudinal axes. A special concern is with the provision of an image, such as a logo, at intervals along a web of paper such that when the web is later slit longitudinally and cut transversely into individual sheets, each sheet will bear the image.

The invention is, however, contemplated to be of more general utility in the marking of a moving sheet of material. It will be understood that in this context "light", whether from a laser or other source, includes radiation both within and without the visible spectrum. "Marking" of a sheet is used herein to mean effecting a change in the sheet by impinging light on the sheet. Such a change may, for example, be thermally induced or photochemically induced, and may or may not be visible. The practice of the invention finds particular application where the marking to be applied to the sheet is in accord with some prescribed pattern or design. The invention will be particularly described in relation to marking paper with a visible image.

It is long-established in paper making to water-mark the web on the Foudrinier wire. The web is so marked at sufficient intervals both across and along the web such that when it is finally sliced and cut into individual sheets, each sheet will bear a water-mark associated with the paper manufacturer. In practice water-marking in the conventional fashion is only economical for relatively expensive grades of paper that are produced at relatively slow speed. Conventional water-marking is not normally applied to papers in which the water-marking may be obscured by subsequently applied coatings. It is not applied with paper that is to be used in the manufacture of carbonless-copy paper, except for letter-head or relatively low tonnage premium qualities, primarily on the economic ground above mentioned. Nonetheless, the manufacturer of such papers may wish to identify the paper with himself, since cut sheet as packed and sold will normally bear the label of some other company. Thus the need arises for some other means of marking which is identifiable but is not too obtrusive for the use for which the paper is intended.

Many materials such as metal, plastics and paper can be marked by use of laser light which may remove a coating layer or act on a surface layer of a base material. Such action may be a removal or "burning" of material or other thermally induced change, such as a colour change, depending on the material in question. An example of the use of lasers for this purposed is described in the journal "Laser Focus", July 1975, pages 28 to 32 under the heading "Fast laser pulses can etch a pattern on a moving part on a production line". Apparatus for this general purpose is available from various manufacturers. In the commercially available apparatus a mask containing the pattern to be marked on the product is imaged onto the product. The mask is in the form of a stencil through which light is transmissible. The whole mask is illuminated with a laser pulse to produce pulsed image on the product. By using short pulses of sufficient energy, the apparatus can clearly mark a rapidly moving surface.

Such apparatus can be used for the marking of paper. In principle it can be used on a paper making machine or in other machines for processing manufactured web, such as coating machines that apply the micro capsules for carbonless copy paper as disclosed in patent specification EP No. 0240259. Such a web may be typically up to several meters wide and is normally subsequently longitudinally slit into reels which may then be used to provide sheets either in pre-cut form or to provide continuous stationery. Thus each longitudinal section to be slit from the web requires to be marked at intervals along its length. Whilst in principle this can be done in the pulse imaging system described with the aid of beam splitters, beam splitting divides the pulse energy requiring an increase in the power of laser source for required image intensity at the web. The pulse power required is relatively high since the whole mask area as imaged on the web is illuminated at one time and the effective dwell time on the moving web is necessarily short in order to prevent blurring of the image. Typically a web may be moving at speed up to 20 m/s.

There have been numerous proposals to use laser energy to perforate cigarette tipping paper. Here the object is to form small perforations, not to make any image on the paper. Such proposals have used optical switching means, possibly combined with focussing arrangements, to direct a laser beam to successive locations across and along the web. The proposals involve the use of staggered arrays of optical elements, often arranged in a rotary fashion. Examples are found in U.K. patent specifications GB Nos. 1603752, 2022492, 2027628 and 2032323; and in European specifications EP No. 0021165 and 0047604. Optical switching arrangements are also disclosed in GB No. 2074341 and EP No. 0042173. An alternative to optical switching is disclosed in GB No. 2118882 in which a web of cigarette tipping paper passes over a drum containing spaced circumferential rows of apertures at which individual lasers located in the drum are directed.

Specification GB No. 2161752A discloses the application of laser energy to a web at selected points. GB No. 2133352 describes how a laser beam can be used to mark a moving product by use of electronically-controlled beam deflection to produce indicia on a dot matrix bases.

It is also known to laser engrave materials, including paper. Such a system is described in GB No. 2126955 in which the engraving image and the object to be engraved are essentially raster scanned by a focussed laser beam. This is not suitable for multiple marking of a moving web.

In a prior proposal disclosed in European Patent Application No. 88300269.3 (published under the number EP-A No. 279505 on Aug. 24, 1988) a continuous wave CW laser is utilised to provide the marking of the web at several locations transversely on the longitudinally moving web and repetitively along the web. The web is marked with an image derived from an image-bearing mask. The input beam is sequentially switched to the several output locations by optical elements and may be arranged to provide almost continuous use of the laser beam energy. Effectively the optical switching elements serve to sequentially establish a plurality of optical paths terminating at the output locations but having a common input for receiving the laser beam. It is of particular interest to mark the web with an image which is derived from an image-bearing mask. The mask is scanned in a manner which enables a lower power beam to be used than would be the case of imaging the whole mask. More particularly, to effect scanning, the incoming laser beam is focussed to a predetermined configuration, specifically a line, which is scanned across the mask so as to modulate the intensity distribution. The scanning of each mask is performed by focussing the beam to a line configuration that is fixed in space and moving the mask through the focus. Such a focus is required for each output location across the web. The foci intercepted by the respective masks may lie in a plane that is essentially at the web surface. This is a contacting system in which the web is conveniently guided over the surface of a rotating drum. The masks are located at the surface and the other optical elements are contained within the drum. Alternatively the web may be moved in a plane spaced from the drum. Each line focus is re-imaged to the plane of the web so that as a line focus scans a mask the scan is reproduced on the web.

In putting the above prior proposal into practice, the beam-switching and focussing into lines is done by arrays of conical mirror segments or else the switching and focussing functions are separated by means of a combination of plane switching mirrors in rotary arrays—the array mirrors being interleaved—together with fixed conical mirror segments.

There will be described hereinafter an apparatus system and method in accord with the present invention which reproduces the image of a moving image-bearing mask onto a moving sheet, specifically a web, but in which the mask is scanned by a non-focussed beam of light, specifically a laser beam. The beam impinging on the mask is reflected from a moving mirror that causes an angular scanning of the reflected beam which in turn is used to scan the moving mask. This principle enables an array of mirrors to be constructed to perform beam switching and scanning for marking a web along spaced longitudinal axes. As will be shown the scanning and switching are obtainable using plane mirrors. The mirror array and its associated masks are of a generally drum-like or cylindrical construction.

Aspects of the invention and preferred features of it are set out in the claims following this description.

An embodiment of the invention will now be further described with reference to the accompanying drawings, in which.

Figure 1:
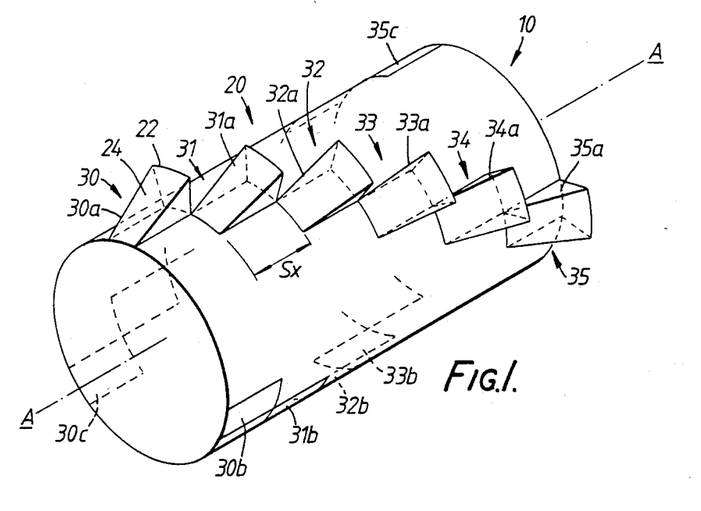
FIG. 1 shows a perspective view of a drum carrying a plane mirror array.
Figure 2:
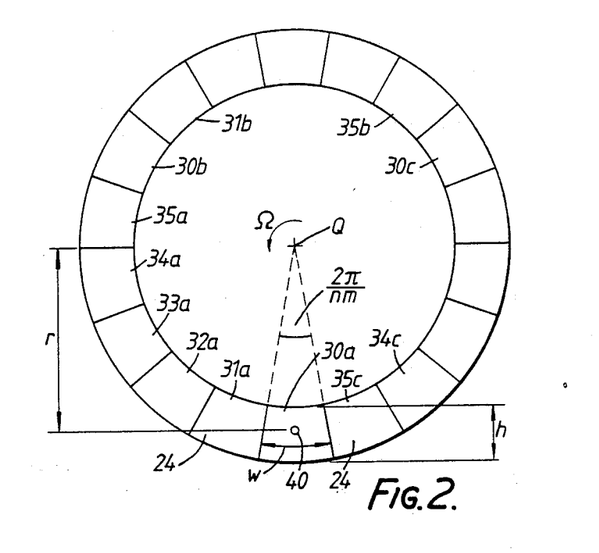
FIG. 2 shows an axially-directed, i.e. end-on, view of the mirror array.

Referring to FIG. 1, a cylindrical drum 10 is mounted for rotation about its axis A—A. The outer surface of the drum 10 carries an array 20 of mirror elements 22, each having a plane mirror surface 24 whose plane is at 45° to a plane normal to the axis A—A. All the mirrors lie at the same radius from the axis for impingement thereon of a laser beam directed parallel to the axis as will be later described. The array is divided into axially-spaced sets of mirrors 30 to 35, the axial spacing being denoted Sx. For clarity only one mirror 30a, to 35a of each set is shown. The positions of further mirrors 30b, 30c etc. are illustrated. The sets are angularly offset from one another so that an axial series of mirrors such as 30a–35a, 30b–35b each form a helix. The array of mirrors seen from one end of the drum in FIG. 2 fills a circular annulus to provide a continuous reflecting surface as seen by a laser beam 40 directed perpendicularly into the plane of FIG. 2 parallel to the axis A—A at a distance r from the axis. The laser beam 40 is illustrated as being vertically below the axis which is indicated by point Q in FIG. 2. The mirror surfaces 24 all have the same circumferential dimension w at the radius r and as is seen projected onto the plane of FIG. 2 are wedge-shaped. The laser beam source (not shown) is a continuous wave (CW) laser.

It will be appreciated that the laser beam successively impinges on a respective mirror from each set such as 30a, 31a . . . 35a. That is, the mirrors of the sets are interleaved and angularly offset. Consequently the beam will be reflected radially away from axis A—A at successive axial positions corresponding to mirrors 30a–35a and then the sequence will be repeated for mirrors 30b–35b and so on, dependent on the number of sets m and the number of mirrors in each set, n. As illustrated m=6 and n=3. As the mirrors fill a complete annulus as seen in FIG. 2 each subtends an angle of $2\pi/m.n$ radians about the point Q.

In FIG. 1 each mirror has a transverse dimension which is equal to the spacing Sx. Thus each mirror is capable of projecting a beam across the full transverse width Sx of each longitudinal section of the web. In practice the mark to be made has a transverse dimension Lx which is only a small fraction of Sx and the transverse extent of each mirror, and therewith its radial height h from the drum surface, can be reduced accordingly. This is discussed further below.

For an initial explanation of the optical operation of the system and to illustrate the optical paths involved, it will be assumed that the laser beam 40 is of small cross-section relative to the mirrors, though, as will be later discussed, in practice the beam is given a substantial cross-section to illuminate at least a major part of each mirror surface.

Figure 3:
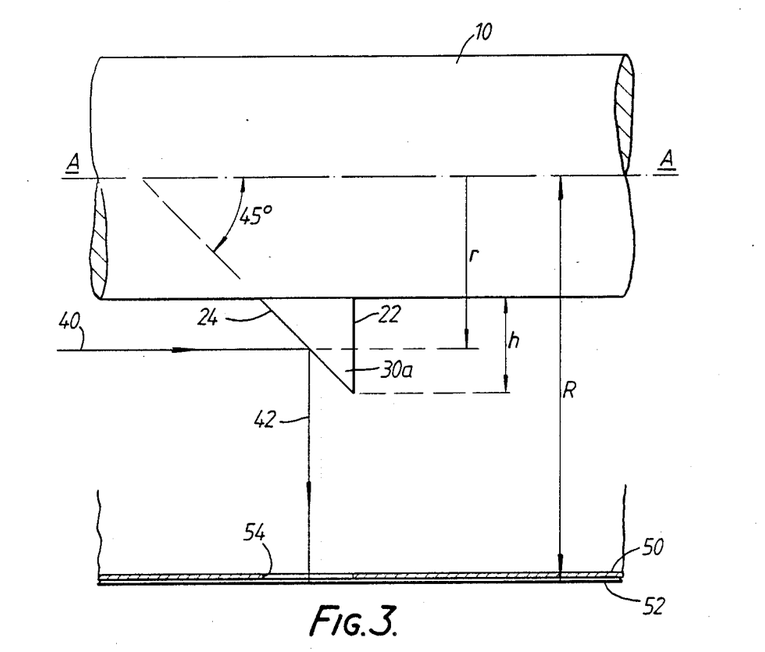
FIG. 3 is a simplified side view of the drum coaxial, and rotating as a unitary structure with, a web-guiding cylinder external to the drum, only the one mirror currently intercepting the laser beam being shown to illustrate the optical path.

Referring now to FIG. 3, there is shown one mirror element 22 as it passes through its lowermost center position with the plane of the mirror surface 24 normal to the plane of the drawing and at 45° to the axis of the input beam 40. At this one instantaneous position the beam is reflected vertically downwards as indicated at 42.

The drum 10 is coaxially located within a larger drum or cylinder 50 over which passes a web of paper 52 moving through a paper making or paper coating machine. It will be readily apparent to those skilled in the art that cylinders or drums intended for special purposes can be installed along the web path in paper making machines. In this use, as is better illustrated in FIG. 4, the web 52 passes over an area of cylinder 50, with the aid of additional guide rollers if necessary, with the common axis A—A of cylinder 50 and drum 10 perpendicular to the direction of web movement. Thus in FIG. 3 the web is moving normal to and out of the plane of the figure. The drum 10 and cylinder 50 are mounted as part of a unitary structure rotating anti-clockwise as seen from the left of FIG. 3. The drive means is not shown but is arranged to match the outer peripheral speed of the cylinder 50 to that of the web 52. As will be further discussed below, the cylinder 50 has a respective aperture 54 radially aligned with each mirror element 22 so that the apertures are in axially-spaced sets corresponding to the mirror sets 30–35. Each set of apertures lies in the same plane as its associated mirror sets, there being an equal number of mirrors and apertures. The radial alignment ensures that as each mirror achieves its beam reflection position, the associated mask aperture achieves a marking position for the web as will now be described. These apertures locate image-bearing masks discussed later. Assume for the moment that the apertures are open and are of rectangular shape with the longer dimension in the circumferential direction. The cylinder 50 has an external radius R which defines the radius of the arcuate path through which web 52 is moving.

Figure 7:
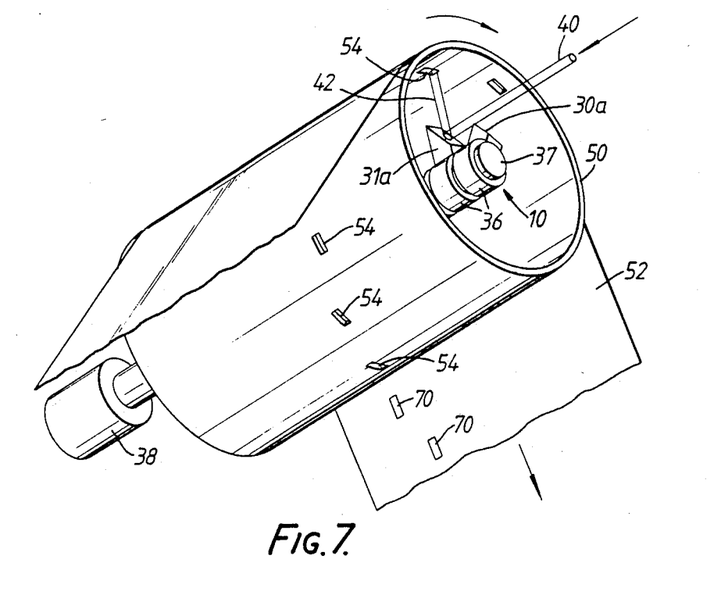
FIG. 7 shows a perspective view of an implementation of a mirror drum and web-guiding cylinder assembly of the kind illustrated in FIGS. 3 and 4.

One implementation of the kind of mirror drum and cylinder arrangement envisaged may be better appreciated from the perspective view of FIG. 7 which shows the cylinder 50 about which the web 52 is carried in its movement along the paper path. The cylinder having the peripherally and laterally staggered series of apertures 54 through which marks 70 are produced on the web as will be more fully described with reference to FIG. 5.

FIG. 7 also shows the manner in which the mirror drum 10 of FIG. 1 can be constructed and located within the cylinder 50. The drum is conveniently constructed as a shaft carrying fixedly secured rings which in turn carry the mirrors. This is indicated as assembly 10' in FIG. 7. Each mirror, 30a, 31a, etc. can be mounted on a ring 36 secured on a central shaft 37 driven by a motor 38. The cylinder 50 and shaft 37 can be connected to rotate in unison by means of spokes (not shown). The spokes may be provided at the ends of the cylinder remote from the beam input path 40, and for adequate rigidity by also locating spokes rearwardly of the mirrors within the cylinder with respect to the beam input. Such positioning of the spokes ensures no diminution of the total aperture seen in FIG. 2.

As already mentioned, at the instantaneous position shown in FIG. 3, the reflected beam 42 is directed vertically downwards through the associated aperture 54 and impinges on the web 52 normal thereto. As the mirror surface 24 rotates about axis A—A, its plane skews with respect to the position shown, that is it no longer remains normal to the plane of the drawing. The result is that as the mirror moves in its rotation from a position preceding that shown to one succeeding that shown the reflected beam 42 is swung through an arc from a position trailing the angular position of the mirror to a position leading the mirror. As the cylinder 50 is rotating with the mirror, the beam is likewise swept forward over the aperture 54 in the drum. This forward sweep of the beam is used to scan the mask-receiving aperture. As the beam leaves the mirror surface of one set—e.g. 31a—it impinges on the mirror in the next set—32a—and provides a like scan of its associated drum aperture that is spaced transversely across the web by the distance Sx.

Figure 4:
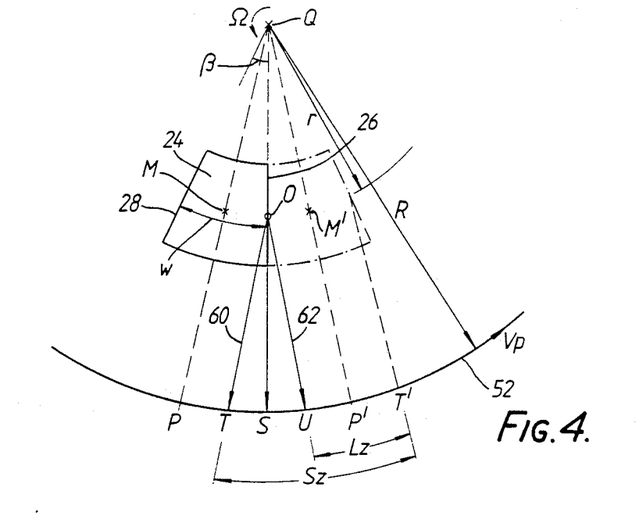
FIG. 4 is a simplified axial view of the drum within the cylinder, only one mirror being shown in two successive positions to illustrate the sweeping of the reflected beam as the mirror rotates through the input beam; the two positions being shown in full and chain line respectively.

The generation of this sweep is shown in FIG. 4 which shows one mirror surface 24 rotating counter-clockwise about the axis A—A that extends normal to the plane of the figure through the point Q. As in FIG. 2, the incoming laser beam 40 is directed normal to the plane of the figure at the distance r vertically below the axis. The beam axis is indicated as an origin O for the reflected paths now to be described. The web 52 moving with the cylinder 50 (not shown) traverses the arcuate path shown at the radius R about point Q. The mirror surface 24 is shown in full line in a first position with leading edge 26 just intersecting the beam. The mirror surface has a central meridian which is radially oriented as projected onto the plane of FIG. 4 and which will intersect the beam 40 at point M as the mirror continues to rotate. On further rotation the beam will leave the trailing edge 28 of the mirror when the mirror is in a second position shown in chain line position.

When the beam 40 strikes the meridian point M, the mirror is mid-way between the full and chain line positions of FIG. 4 and the mirror plane is in the position shown in FIG. 3 in which the beam is reflected vertically downward, that is along a radial line extending from Q to strike the web at point S. Considering generally reflection from plane mirror surface 24, it will be appreciated that the laser beam impinging on the flat mirror surface will be reflected in a direction which is parallel to that in which it would be reflected had the beam been translated laterally to impinge on the meridian axis.

Thus in the full line mirror position of FIG. 4 with beam 40 intercepted by edge 26 the reflection of the beam is along a line 60 to strike the web at T. Line 60 is parallel to the radial line QP extending through the median point M and containing the projected meridian axis. Upon further rotation of the mirror to bring point M into intersection with the beam, the axis QP is now vertical and the beam is reflected vertically downwards to point S. This is the mirror orientation of FIG. 3. Further rotation of the mirror to the chain line position brings the radial QP through the point M (shown as M') to the position QP'. The beam is reflected along line 62 to strike the web at point U. It is seen that the beam position in the apparatus, i.e. in space, has advanced as the mirror rotates. If the angle subtended in the plane of FIG. 4 by the points at which the leading edge 26 and trailing edge 28 intersect the beam is $\beta$, then it can be seen that the angle PQP' is also $\beta$ and that the angle of advance of the reflected beam about the origin O is also $\beta$.

At the same time as the mirror 24 has moved through the angle $\beta$ so has the web 52 moved through the same angle about Q. The point T at which the beam first struck the web has advanced to the point T'. Thus the area marked on the web is that between T' and U. It may aid understanding the scanning operation to imagine the mirror 24 and web 52 as being fixed and the laser beam 40 being moved clockwise around point Q at radius r which is entirely equivalent to the operation just described. If the mirror was fixed in the chain line position, it is readily seen that the beam moving about Q, with its axis maintained normal to the plane of the drawing, would generate a reflected beam to move from T' to U, all reflected beams being parallel in their orientations. It is to be further noted that as the web has moved from T to T' over an arc of length Sz, the beam has impinged on and marked the web over an arc UT' of length Lz (the x and z suffices indicate the transverse and longitudinal directions respectively of the web). The ratio of Lz to Sz can be adjusted by selection of R/r in any practical apparatus.

It will be appreciated from the geometry of FIG. 4 that provided the mirror 24 is rotating at a uniform rate $\Omega$, the reflected beam will scan from T to U about 0 at the same uniform rate. This leads in turn to the beam advancing over the web at a substantially uniform velocity $\Omega(R-r)$. This is not exactly uniform because the path TSU is not quite, though it closely approximates, an arc of radius $(R-r)$. The path and arc coincide at S.

Having described the scanning of the beam by one mirror, attention can now be given to the array 20 as a whole. If, for example, the mirror 24 of FIG. 4 is particularized as being that of mirror 30a of the array seen in FIG. 1, it will be appreciated that as mirror 30a reaches the chain line position of FIG. 4, mirror 31a reaches the full line position so that the beam immediately switches from its trailing edge of mirror 30a to the leading edge of mirror 31a. As seen in the axially directed view of FIG. 4 the beam instantly switches or flies back from point U to point T, and begins a new scan in the manner already described except that the new scan is offset across the width of the web by the distance Sx (FIG. 1).

Figure 5:
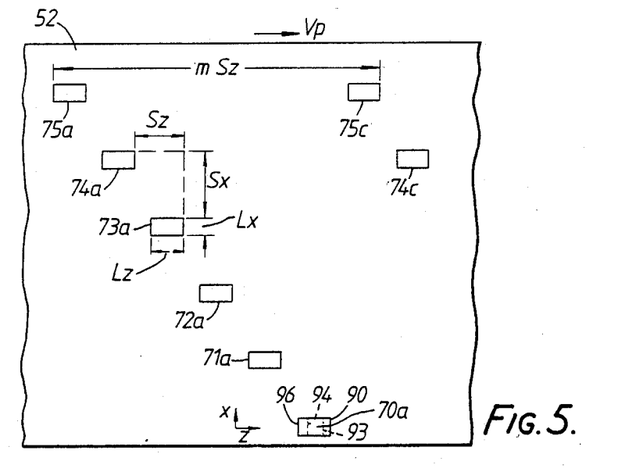
FIG. 5 shows a section of web indicating the marking areas (in the absence of image bearing masks)

When the trailing edge of mirror 35a leaves the beam at the farther side of the web the beam is intercepted by the nearer-side mirror at position 30b so that there is an instantaneous flyback to the starting position. In space the successive interceptions of the beam by mirrors 30a–35a cause the beam to perform a fixed raster type of scan across the web, the scan lines extending in the longitudinal (z) direction of the web and with instantaneous flyback between successive scan lines and from the end of one raster to the start of the next. This spacially fixed raster scan is translated into a longitudinally staggered series of marks on the web due to its longitudinal movement, as is shown in FIG. 5, where the marks 70a–75a are produced by the scanning action of mirrors 30a–35a respectively. It will be noted that in addition to the marks having the dimensions and spacings already discussed, each is shown not as a line but as an area having the length Lz already mentioned and a width Lx. This requires the laser beam 40 to be given a substantial transverse cross-section as reflected on the web, as will be discussed below.

Continuing for the present with the assumption of the laser beam as a single ray path, further consideration can be given to the operating parameters already discussed. For the plane mirror array discussed above, the ratio Lz/Sz is a function of r/R from the geometry of FIG. 4. However, it is not essential to use plane mirrors. Non-planar mirrors could be used, for example to modify the beam shape at impact on the mask. The stagger Sz between successive marks is a function of the paper velocity Vp, which in the example discussed is given by $Vp=\Omega R$, where $\Omega$ is the common angular velocity of mirror drum 10 and the paper-carrying cylinder 50. In practice, the paper velocity Vp will be the governing factor in designing the parameters of the marking apparatus since Vp is set by the paper making or coating machine in which the apparatus is installed. It is not essential that the drum 10 and cylinder 50 have the same angular velocity. If the cylinder velocity is the higher, the stagger Sz is increased and vice versa. It does not affect the Lz/Sz ratio.

Some indication of practical design values for the apparatus so far discussed will now be given. The total number of mirrors in the array 20 is m.m, where it will be recalled that m is the number of mirror sets along the drum 10 and n is the number of mirror helices extending along the drum. There are n.m marks per revolution of cylinder 50 of the external diameter R so that the stagger Sz is given by:

$$Sz = 2\pi R/n.m \qquad (1).$$

It can be shown that on the assumption that the whole apparatus rotates together at the same angular velocity, to a close approximation the actual length Lz of each mark is given by:

$$Lz/Sz = r/R \qquad (2).$$

To provide a given size of sheet (say A4) from the web, it is slit longitudinally into rolls and the rolls cut transversely into sheets. To provide a mark on each sheet, there is to be a set of mirrors aligned with each longitudinal section. Thus the number m of mirror sets equals the number of such sections.

In the longitudinal direction it will be seen from FIG. 5 that the marks along a given longitudinal section are spaced by m.Sz and from equation (1) this interval is equal to $2\pi R/n$. Thus the required outer radius R of the cylinder 50 depends on the number n of mirrors per set. The drawings show n=3 but n=4 is presently considered preferable. If both the longitudinal interval m.Sz and the transverse spacing Sx are set at 210 mm (the smaller dimension of an A4 sheet) to ensure that a mark appears on all sheets, however the web is cut, then for n=4, the radius R of cylinder 50 is 133.7 mm. For m=10, Sz is 21 mm. A mark length Lz of typically 14 mm is presently contemplated. From equation (2), this gives an offset r from the laser beam axis of 89.1 mm.

Before going on to discuss a practical laser beam of significant cross-section, attention is drawn to FIG. 5 in which the transverse dimension Lx of each mark is much less than the transverse spacing Sx. In the example being considered Lx is contemplated as being 6 mm. The transverse extent of the mirror, which equals its radial height h (FIG. 3) in the 45° case, illustrated can be brought down to a value of a little in excess of 6 mm, thereby fitting easily within the outer cylinder 50. The reduction of the transverse dimension of the mirrors does not affect the annular pattern shown in FIG. 2 and thus does not affect the instantaneous beam switching already discussed.

Referring to FIG. 2 again, the mirror array of m.n mirrors fills the circular annulus, so that each subtends an angle $2\pi/mn$. The arcuate width w of each at the radius r is thus $2\pi r/mn$ which for the dimension derived gives value of 14 mm. In fact it can be shown that to a close approximation w=Lz. This is seen in FIG. 4 where the chord UT' is equal to the chord corresponding to arc w.

Figure 6:
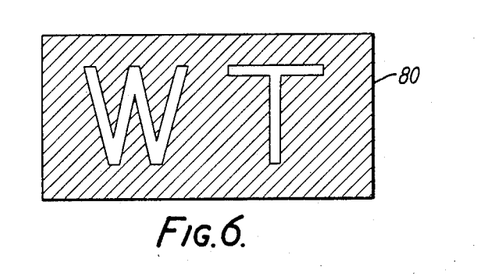
FIG. 6 shows an image bearing mask for use in a paper-making machine to provide an image at intervals both across and lengthwise of the web such that an image will appear on each of the individual sheets to be cut from the web.

In discussing the formation of marks over an area Lx by Lz, it will be noted from FIG. 3, in particular, that the web is in close contact with the cylinder 50. Consequently, the apertures 54 in the cylinder aligned with the mirror elements 22 are at least of this size to allow marking over the required area of the web. So far the apertures 54 have been assumed to be open exposing the whole of the web within the aperture limits to irradiation. To form an image such as a logo on the web at each of the areas shown in FIG. 5, each aperture may be provided with a stencil 80 located therein such as is illustrated in FIG. 6. The stencil could be of a foil, for example copper, having the appropriate logo, "WT" as illustrated, cut out to allow the web to be marked with this lettering.

It is presently considered preferable that each aperture 54 contain a mask-bearing inset. Alternatively the aperture 54 could be a window of a material transparent to the laser wavelength used, the window having one surface carrying metallisation patterned in accord with logo or image to be marked. Carbon dioxide lasers which are useful for the present purposes have wavelengths in the infra-red where germanium is a suitable transparent material. For accuracy of registration of the image on the web, the metallisation may be better on the outer side of the window. For protection against wear it may be preferred to have the metallisation on the inner surface away from the web, particularly if the beam is well collimated to project the image without serious degradation.

Attention will now be given to the characteristics of the laser beam required to produce an image or other marking of uniform intensity contained within each marking area of size $Lx \times Lz$.

Although the optical path traversed by the laser beam has been described in terms of a single ray path, as already mentioned the beam is in practice given a large enough cross-section to fill at least the width Lx of the markable area (FIG. 5). Thus as seen in FIGS. 2 and 3, the incoming beam 40 will have a vertical extent at least comparable to the height h of the mirror surface 24 in the radial direction to make optimum use of the mirrors. Since h (say 6 mm or slightly greater) is less than w (say 14 mm) the beam does not fill the mirror in the scanning direction but the scanning itself will ensure the delivery of the required energy over the mask in the z direction. The scanning of the beam in the z direction does, in fact, result in the energy at any point in the marking area being a function of the beam energy distribution and the time of dwell. This may be better appreciated by first taking a simplified case.

Looking at FIG. 5, assume that as the beam impinges on the leading edge of a mirror, say 35a, it starts to produce an illuminated rectangular area having a leading edge that is coincident with one transverse edge 90 of the area marked 70a. As the beam moves across the mirror, when it is equally distributed about the meridian of the mirror, (but not touching either edge 26 or 28) the illuminated area will appear as indicated by dotted lines 93 and 94 moving to the left. Finally as it leaves the trailing mirror edge 28, the trailing edge 93 of the illuminated area is coincident with transverse edge 96 of the area marked.

The total energy received by any point having a given x value is the same, the energy being the integral of the beam distribution in the z direction at that x value and the dwell time. The above-mentioned uniform rate of sweep of the beam over the paper ensures that the same energy is delivered at any point having the given x value. To illustrate these concepts further, assume that in the rectangular distribution shown on area 70a, the distribution in the x direction is uniform for any z value: then the total energy received at any point in area 70a is the same however the beam irradiance varies in the z direction.

The foregoing discussion has been simplified. Real laser beams have a circular cross-section and may be operated in various modes for which the energy integral may be calculated along various chords in the z direction. Use may be made of a selected section or slice of the beam cross-section. For the marking arrangement given by way of illustration where Lx is 6 mm, the beam should have a diameter of at least this—such diameters are readily obtainable in laser systems. The beam may overspill in the x direction, the mirror height h and/or the transverse dimension of the mask window being used to mask out unwanted portions of the beam. With the plane mirror arrangements disclosed and the 45° angle, the beam 42 reflected on the mask in at least the median position of the mirror will have the irradiance distribution of the incoming beam 40. Some modification of the reflected beam distribution may be achieved by contouring of the mirror surfaces.

Figure 8:
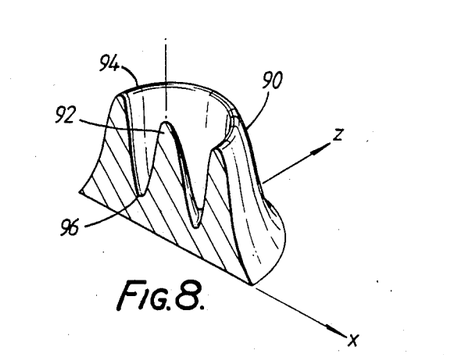
FIG. 8 shows the irradiance (power density) distribution of a laser beam particularly suitable for use in the practice of the present invention.

A laser beam which combines efficient use of the laser power with obtaining uniform marking is a beam having a ring mode irradiance distribution of the kind shown in FIG. 8 which shows in a three-dimensional representation one hemi-circle 90 of the circularly symmetrical mode structure. The mode structure is a combination of $TEM_{00} + TEM_{01}^*$ modes providing a central peak 92 and an outer ring 94 of about equal peak value but not falling to zero in the valley 96 between them. It has been found that such a beam provides a substantially uniform energy delivery to any point swept by the beam except at the lateral margins of the sweep. Furthermore, provided the time taken for the beam to sweep past a given point on the paper does not exceed about 10 milliseconds the paper responds to the integrated exposure rather than the fine structure of the beam. In the present case with the values of R and r given above, for a typical web velocity of 1100 m/min. the scanning velocity is about 730 m/min. which provides a sweep time very much less than the 10 ms. just-mentioned.

The beam may be truncated to remove the lateral margins, as by use of a mask, but the amount of beam power lost with the beam of FIG. 7 is small in so doing.

One advantage of the apparatus described is that the beam does not have to be brought to a focus. The beam is traversing paths of different lengths across the web to the different mirror sets and the optical system is relatively simple in the absence of the need to focus the beam at each mask location. Mention has already been made of the degree of beam collimation desirable to register the mask image on the web dependent on the distance between the web and the mask.

In the system thus far described, the web has been guided around the outer surface of the cylinder 50 so as to be closely adjacent to and effectively contiguous with the masks for marking purposes. It is possible that a non-contacting system might be employed in which the web moves in a path spaced from the cylinder.

To this end a respective imaging system is aligned with each set of masks across the cylinder so that the mask currently being scanned is imaged on the web. This is possible provided both the web and mask are moving at the same speed, as in the direct contact case, and allowing for any optical reversal. The mask scanning laser beam is then imaged to likewise scan the mask image on the web.

The laser may be a carbon dioxide laser with its output in the infra-red as already mentioned. It is envisaged that the laser output will be about 2.5 KW for marking carbonless copy base paper using a beam of the kind shown in FIG. 7 and the dimensions quoted above. For a larger mark—that is of greater width Lx (as in FIG. 5)—a larger diameter beam would be required to cover the mask in the x direction. A larger beam power would be necessary to obtain the power density at the paper surface. It is intended that the system described employ a continuous wave (CW) laser which is utilised as fully as possible by the mirror array described. However, the scanning principle disclosed might be employed where a more intermittent marking was required and in which case a pulsed laser might be more appropriate to the task.

In the apparatus described the mirror array and cylinder rotate as an entity. The uniting of the two into a single rotating structure enables a robust construction to be adopted suitable for the rigours of locating in a paper making or coating machine. However, other constructions are feasible. For example, the number n of helices could be reduced by having the mirror array rotate faster. In the limit one helix only could be used provided the mirror array is then set to rotate at n times the speed it would otherwise rotate at. The mirror array need not be coaxial with the cylinder 50. The axes of the two might be offset though preferably still parallel. The requirement in any such modification is to synchronize the separate parts so as bring mirrors and masks into the necessary scanning alignment and to produce the described scanning action on reflection of the laser beam from the relevant mirror.

The masks have been described as insets in a paper-guiding cylinder. Particularly if a non-contacting system were adopted, various other mask-mounting constructions are possible.

Although the invention has been discussed in terms of a laser beam as the energy source, non-coherent sources might also be used.

What is claimed is:

1. Apparatus for marking a moving sheet of material with light energy, comprising:
   a mask having a light transmissive area of predetermined configuration defining a mark to be made on a moving sheet;
   means mounting said mask for rotation about a predetermined axis to move said mask in a circular path;
   a mirror;
   means mounting said mirror for rotation about a predetermined axis to move in a circular path which includes a reflection location at which the mirror intersects a predetermined input light beam axis along which an input light beam is directable;
   the motion of said mirror through said reflection location providing a beam reflection path that is angularly scanned in space;
   said angularly scanned reflection path intercepting said circular path of said mask at a marking location; and
   means controlling the respective rotations of said mask and mirror to cause said mask to move through, and said reflection path to intercept, said marking location simultaneously but at different speeds so that said reflection path scans said mask.

2. Apparatus as claimed in claim 33 in which said mirror and said mask are mounted for rotation about the same axis.

3. Apparatus as claimed in claim 2 in which said mirror and said mask are radially aligned when the mirror and mask are in their reflection and marking positions respectively.

4. Apparatus for marking a moving sheet of material with light energy, comprising:
   a plurality of masks each having a light transmissive area of predetermined configuration defining a mark to be made on a moving sheet;
   means mounting said masks for rotation about an axis to move each mask in a circular path;
   a plurality of mirrors;
   means mounting said mirrors for rotation about an axis to move each mirror in a circular path which includes a reflection location at which said each mirror intercepts a predetermined axis along which an input light beam is directable, said mirrors being angularly disposed about their axis of rotation so that said mirrors successively pass through their respective reflection locations as they rotate;
   the motion of each mirror through its reflection location providing a beam reflection path that is angularly scanned in space;
   each angularly scanned reflection path intercepting the circular path of motion of a respective mask at a marking location;
   means for controlling the respective rotations of said masks and said mirrors to simultaneously cause a respective mask to move through its marking location and the respective angularly scanned path to intercept same, but at different speeds so that the reflection path scans the mask.

5. Apparatus as claimed in claim 1 in which said predetermined input light beam axis is parallel to the axis of rotation of said mirror.

6. Apparatus as claimed in claim 1 in which said mirror is a plane mirror.

7. Apparatus as claimed in claim 6 in which the plane of the mirror in the reflection position is at 45° to said predetermined input light beam axis.

8. Apparatus as claimed in claim 1 in which said mirror has in one direction a dimension that, as projected onto the transverse dimension of said mask for the purposes of light reflection to the latter, is at least as great as said transverse mask dimension.

9. Apparatus as claimed in claim 4 in which said plurality of mirrors are arranged on, and angularly offset about, a common circle and said plurality of masks is at least equal in number to the number of mirrors and lies on a circle co-planar with that of said mirrors.

10. Apparatus as claimed in claim 4 in which the mirrors of said plurality of mirrors are axially spaced and angularly offset from one another about the mirror axis of rotation so as to successively achieve the reflection position, and in which the masks of said plurality of masks are axially spaced in correspondence with the axial spacing of the mirrors so that each mask achieves its marking position simultaneously with a respective mirror achieving its reflection position.

11. Apparatus as claimed in claim 4 in which said plurality of mirrors comprises a plurality of axially spaced sets of mirrors all lying at the same radius of rotation, the sets being mutually angularly offset whereby successive mirrors achieving the reflection position are from different sets.

12. Apparatus as claimed in claim 11 in which the succession of mirrors achieving the reflection position comprises a sequence of a mirror from each set.

13. Apparatus as claimed in claim 11 in which said mirrors as viewed from the direction of said predetermined input light beam axis fill a circular annulus.

14. Apparatus as claimed in claim 1 in which said mask mounting means comprises a cylindrical structure having an exterior surface for receiving and guiding a moving sheet to receive light transmitted through said mask.

15. A system as claimed in claim 8 further comprising a source of light energy disposed to direct a light beam along said predetermined input light beam axis, said beam having a cross-section that illuminates said mirror over its dimension in said one direction so as to illustrate the transverse dimension of said mask.

16. Apparatus for marking a moving sheet of material with light energy, comprising:
- a mask having a light transmissive area of predetermined configuration defining a mark to be made on a moving sheet;
- means rotatably mounting said mask for movement about a predetermined axis to move said mask in an arcuate path;
- a mirror;
- means mounting said mirror for rotation about a predetermined axis to move in a circular path which includes a reflection location at which the mirror intersects a predetermined input light beam axis along which an input light beam is directable;
- the motion of said mirror through said reflection location providing a beam reflection path that is angularly scanned in space;
- said angularly scanned reflection path intercepting said arcuate path of said mask at a marking location; and
- means controlling the respective movements of said mask and mirror to cause said mask to move through, and said reflection path to intercept, said marking location simultaneously but at different speeds so that said reflection path scans said mask.

17. A method of marking a moving sheet of material with light energy comprising:
- directing a light beam along a predetermined axis;
- moving a light transmissive mask along a predetermined path;
- moving a mirror along an arcuate path to intercept the light beam axis and angularly scan a reflected beam about said axis and along a portion of said mask path;
- synchronizing and establishing the speeds of the movements of the mirror and the mask such that said mask moves along said portion of the mask path as the reflected beam scans along said portion at a different speed to the mask, whereby the mask is scanned by the reflected beam;
- moving a sheet of material along a predetermined path; and
- optically coupling the mask to the sheet as the mask moves along said portion of its path such that the light transmitted by the mask reproduces the scanning of the mask on the sheet.

18. A method as claimed in claim 17 in which said sheet path extends essentially contiguously to said portion of the mask path.

19. A method as claimed in claim 18 in which the sheet is moved at the same speed as said mask.

20. A method as claimed in claim 17 in which said mask path and said mirror path are both circular.

21. A method as recited in claim 20 in which said circular mask and mirror paths lie in a common plane and have the same axis of rotation.

22. A method as claimed in claim 21 in which said mask path has a greater diameter than said mirror path.

23. A method as claimed in claim 21 in which said mask and mirror move at the same angular velocity.

24. A method as claimed in claim 21 in which the light beam axis is parallel to said axes of rotation and in which the mirror is plane and is at 45° to its axis of rotation.

25. A method of marking a moving sheet of material with light energy comprising:
- directing a light beam along a predetermined axis;
- moving a plurality of light transmissive masks along respective predetermined paths that are spaced in the direction of said light beam axis;
- moving a plurality of mirrors along respective arcuate paths spaced in the direction of the light beam axis to intercept the light beam axis in succession, each intercepting mirror angularly scanning a reflected beam about said axis and along a portion of a respective mask path;
- synchronizing and establishing the speeds of the movements of the mirrors and the masks and establishing the positions of the masks, such that as a mask moves along said portion of its mask path, the associated mirror intercepts the light beam axis to scan a reflected beam along the mask path portion at a different speed to the mask, whereby the mask is scanned by the reflected beam;
- moving a sheet of material along a predetermined path; and
- optically coupling each mask to the sheet as the mask moves along said portion of its path such that the light transmitted by the mask reproduces the scanning of the mask on the sheet so as to mark the sheet at respective areas spaced both longitudinally of and transversely to the direction of sheet movement.

26. A method as claimed in claim 25 in which said mask path portions lie in a common surface and the said sheet path extends essentially contiguously to said surface.

27. A method as claimed in claim 26 in which said sheet and said masks are moved at the same speed.

28. A method as claimed in claim 25 in which said masks move in circular paths of the same diameter, and said mirrors move in circular paths of the same diameter.

29. A method as claimed in claim 28 in which an associated mask and mirror move in circular paths that lie in a common plane and have the same axis of rotation.

30. A method as claimed in claim 28 in which the diameter of the mask paths is greater than that of the mirror paths.

31. A method as claimed in claim 29 in which said mask and mirrors move at the same angular velocity.

32. A method as claimed in claim 29 in which the light beam axis is parallel to said axes of rotation and in which each mirror is plane and is at 45 to its axis of rotation.

33. Apparatus as claimed in claim 4 in which said means mounting said masks comprises a cylindrical structure having an exterior surface for receiving an guiding a moving sheet to receive light transmitted by said masks.

34. Apparatus as claimed in claim 15 in which said light beam is unfocussed.

35. Apparatus as claimed in claim 15 in which said light energy source comprises a laser providing a light beam having a ring mode structure.

36. Apparatus as claimed in claim 35 in which said ring mode structure comprises $TEM_{00}+TEM_{01}*$ modes.

37. Apparatus as claimed in claim 4 in which each mirror has in one direction a dimension that, as projected onto the transverse dimension of an associated mask for scanned light reflection to the latter, is at least as great as said transverse dimension of said associated mask.

38. Apparatus as claimed in claim 37 further comprising a source of light energy disposed to direct a light beam along said predetermined light beam axis, said beam having a cross-section that illuminates each mirror over its dimension in said one direction so as to illuminate the transverse dimension of each mask scanned by a reflected beam.

39. Apparatus as claimed in claim 38 in which said light beam is unfocussed.

40. Apparatus as claimed in claim 38 in which said light energy source comprises a laser providing a light beam having a ring mode structure.

41. Apparatus as claimed in claim 40 in which said ring mode structure comprises $TEM_{00}+TEM_{01}*$ modes.